(12) United States Patent
Nakagawa

(10) Patent No.: US 11,436,873 B2
(45) Date of Patent: *Sep. 6, 2022

(54) ENCRYPTED COMMUNICATION SYSTEM AND METHOD FOR CONTROLLING ENCRYPTED COMMUNICATION SYSTEM

(71) Applicant: TOYOTA JIDOSHA KABUSHIKI KAISHA, Toyota (JP)

(72) Inventor: Masashi Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,352

(22) Filed: Dec. 7, 2020

(65) Prior Publication Data

US 2021/0118247 A1 Apr. 22, 2021

Related U.S. Application Data

(63) Continuation of application No. 15/850,020, filed on Dec. 21, 2017, now Pat. No. 10,885,723.

(30) Foreign Application Priority Data

Dec. 26, 2016 (JP) .............................. JP2016-251969

(51) Int. Cl.
*H04L 9/40* (2022.01)
*G07C 5/00* (2006.01)
(Continued)

(52) U.S. Cl.
CPC ............... *G07C 5/008* (2013.01); *G08G 1/20* (2013.01); *H04L 63/0428* (2013.01);
(Continued)

(58) Field of Classification Search
CPC ........... G07C 5/008; G08G 1/20; H04W 4/44; H04W 12/041; H04L 63/0428;
(Continued)

(56) References Cited

U.S. PATENT DOCUMENTS 9,083,581 B1 * 7/2015 Addepalli ............... H04L 1/008
2010/0180118 A1 * 7/2010 Nakatsugawa ...... G06Q 20/341
713/169
(Continued)

FOREIGN PATENT DOCUMENTS

JP 2007-013754 A 1/2007

OTHER PUBLICATIONS

United States Patent and Trademark Office, Non-Final Office Action dated Sep. 6, 2019, in U.S. Appl. No. 15/850,020, 30 pages.
(Continued)

*Primary Examiner* — Michael S McNally
(74) *Attorney, Agent, or Firm* — Hunton Andrews Kurth LLP

(57) ABSTRACT

A communication system includes a plurality of processors coupled with a network, each of the processors having a predefined encryption method for a communication with a server. Each of the processors configured to determine a primary processor of the processors based on at least one of a processability of the processor, network distance to the processor, or cipher strengths, when the processor is not determined as the primary processor, transfer unencrypted communication data through the network to the primary processor, and when the processor is determined as the primary processor, perform an encryption of unencrypted communication data received, and an encrypted communication with the server by the encryption method of the primary processor.

6 Claims, 4 Drawing Sheets

(51) Int. Cl.
*H04L 67/12* (2022.01)
*H04W 4/44* (2018.01)
*G08G 1/00* (2006.01)
*H04W 12/041* (2021.01)

(52) U.S. Cl.
CPC ........ *H04L 63/062* (2013.01); *H04L 63/0823* (2013.01); *H04L 63/0892* (2013.01); *H04L 63/102* (2013.01); *H04L 67/12* (2013.01); *H04W 4/44* (2018.02); *H04W 12/041* (2021.01); *B60W 2556/65* (2020.02); *H04L 2209/84* (2013.01)

(58) Field of Classification Search
CPC ............... H04L 63/062; H04L 63/0823; H04L 63/0892; H04L 63/102; H04L 67/12; H04L 2209/84; B60W 2556/65
USPC ........................................................ 713/168
See application file for complete search history.

(56) References Cited

U.S. PATENT DOCUMENTS

| | | | |
|---|---|---|---|
| 2014/0005859 | A1* | 1/2014 | Baskin ............... G07C 9/00309 701/2 |
| 2018/0183773 | A1 | 6/2018 | Nakagawa |
| 2018/0368062 | A1* | 12/2018 | Koue ................... H04B 17/318 |

OTHER PUBLICATIONS

United States Patent and Trademark Office, Final Office Action dated Mar. 19, 2020, in U.S. Appl. No. 15/850,020, 22 pages.
United States Patent and Trademark Office, Advisory Action dated Jun. 18, 2020, in U.S. Appl. No. 15/850,020, 4 pages.
United States Patent and Trademark Office, Notice of Allowance dated Sep. 8, 2020, in U.S. Appl. No. 15/850,020, 8 pages.

* cited by examiner

Fig.2A 121 (221)

| ECU Kind | Cipher Strength | Encrypted Communication with Center | Encrypted Communication Priority Flag |
|---|---|---|---|
| 1st ECU | Low | × | × |
| 2nd ECU | Medium | × | ○ |

Fig.2B 121 (221)

| ECU Kind | Cipher Strength | Encrypted Communication with Center | Encrypted Communication Priority Flag |
|---|---|---|---|
| 1st ECU | Low | × | × |
| 2nd ECU | Medium | × | × |
| 3rd ECU (Added) | High | × | ○ |

Fig.3A 121 (221)

| ECU Kind | Cipher Strength | Encrypted Communication with Center | Encrypted Communication Priority Flag |
|---|---|---|---|
| 1st ECU | Low | × | × |
| 2nd ECU | Medium | ○ | ○ |

Fig.3B 121 (221)

| ECU Kind | Cipher Strength | Encrypted Communication with Center | Encrypted Communication Priority Flag |
|---|---|---|---|
| 1st ECU | Low | × | × |
| 2nd ECU | Medium | ○ | ○ |
| 3rd ECU (Added) | High | × | × |

ENCRYPTED COMMUNICATION SYSTEM AND METHOD FOR CONTROLLING ENCRYPTED COMMUNICATION SYSTEM

CROSS-REFERENCE TO RELATED APPLICATION

This is a continuation application of U.S. patent application Ser. No. 15/850,020, filed Dec. 21, 2017, which claims priority to Japanese Patent Application No. 2016-251969 filed Dec. 26, 2016, which both are incorporated herein by reference in their entirety.

BACKGROUND

The following description relates to a communication system that performs encrypted communication with a server and a controlling method for controlling the communication system.

Japanese Laid-Open Patent Publication No. 2007-13754 describes one example of an encrypted communication system in which when a mobile station including an on-board device enters a wireless communication performable area of a base station, the mobile station and the base station establish a wireless communication session to perform a mutual verification. If the mutual verification is accomplished, the base station notifies the server that the mobile station is a valid client. Consequently, the server generates an encryption key that will be shared with the mobile station and provides the encryption key to the mobile station via the base station. When the mobile station moves and establishes a wireless communication session with another base station, the sharing of the encryption key between the mobile station and the server eliminates the need for performing a new client verification related to the mobile station. This increases the speed of encrypted communication performed between the mobile station and the server.

The above system assumes a configuration in which the mobile station and the server perform one-on-one encrypted communication with each other. However, a plurality of on-board devices may be installed in a vehicle to independently perform encrypted communication with the server. In this case, if the on-board devices are each configured to perform encrypted communication with the server using a unique encryption key, the resources of the server used for the encrypted communication process are increased in accordance with the number of on-board devices performing encrypted communication.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

It is an object of the present disclosure to provide a communication system that allows a plurality of processors to perform encrypted communication with a server. It is also an object of the present disclosure to provide a controlling method for controlling the communication system.

An aspect of the present disclosure provides a communication system including a plurality of processors coupled with a network, each of the processors having a predefined encryption method for a communication with a server. Each of the processors configured to determine a primary processor of the processors based on at least one of a processability of the processor, network distance to the processor, or cipher strengths, when the processor is not determined as the primary processor, transfer unencrypted communication data through the network to the primary processor, and when the processor is determined as the primary processor, perform an encryption of unencrypted communication data received, and an encrypted communication with the server by the encryption method of the primary processor.

An aspect of the present disclosure provides a controlling method for controlling a communication system including a plurality of processors coupled with a network, each of the processors having a predefined encryption method for a communication with a server. The controlling method includes causing each of the processors to determine a primary processor of the processors based on at least one of a processability of the processor, network distance to the processor, or cipher strengths, causing one of the processors which is not determined as the primary processor to transfer unencrypted communication data through the network to the primary processor; and causing the primary processor to perform, by the encryption method of the primary processor, an encryption of the unencrypted communication data transferred through the network, and an encrypted communication with the server.

Here, "the primary processor" may be automatically or manually determined in advance before or when the vehicle is shipped or automatically or manually determined after the shipment of the vehicle.

Other aspects and advantages of the present disclosure will become apparent from the following description, taken in conjunction with the accompanying drawings, illustrating by way of example the principles of the disclosure.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

FIGS. 2A and 2B are schematic charts showing one example of contents set in a priority table;

FIGS. 3A and 3B are schematic charts showing another example of contents set in a priority table;

DETAILED DESCRIPTION

One embodiment of an encrypted communication system will now be described with reference to the drawings.

The encrypted communication system includes a plurality of electronic control units (ECUs), functioning as on-board devices. The ECUs perform encrypted communication with a center, which functions as a server located outside a vehicle to control travel information of a plurality of vehicles. Each of the ECUs may be configured as circuitry including 1) one or more processors that operate in accordance with computer programs (software), 2) one or more dedicated hardware circuits such as ASICs, or 3) the combination of these. Each processor includes a CPU and memories such as a RAM and a ROM. The memories store program codes or instructions configured for the CPU to execute processes. The memories, or computer readable media, include any applicable medium that is accessible with a versatile or dedicated computer.

Figure 1:
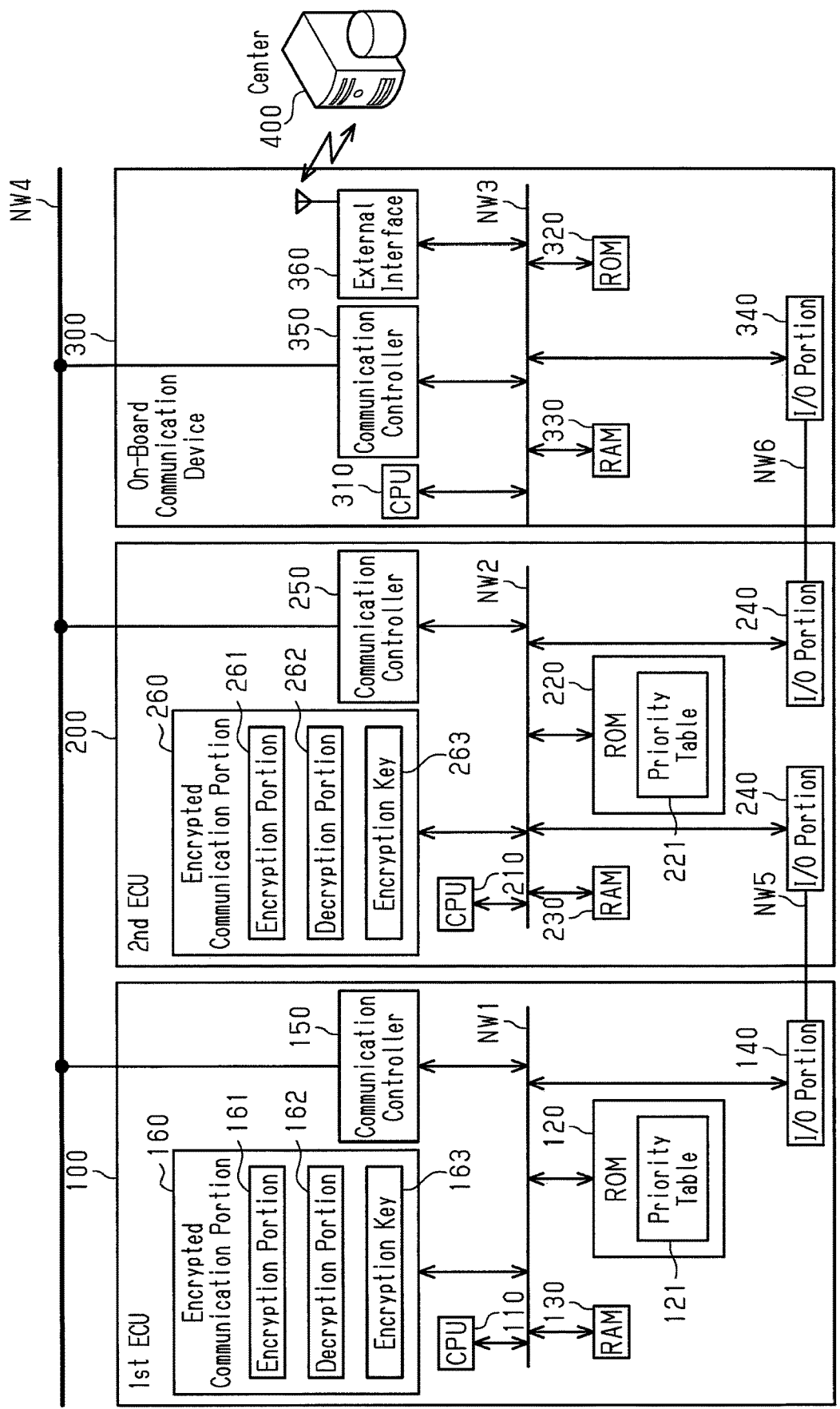
FIG. 1 is a block diagram showing the schematic structure of one embodiment of an encrypted communication system.

More specifically, as shown in FIG. 1, a first ECU 100 and a second ECU 200 respectively include, for example, central processing units 110, 210 (CPUs), read-only memories 120, 220 (ROMs), random access memories 130, 230 (RAMs), I/O portions 140, 240 (input-output port portions), communication controllers 150, 250, and encrypted communication portions 160, 260 that are mutually connected by communication buses NW1, NW2. Additionally, a vehicle network NW4 is connected between the communication controller 150 of the first ECU 100 and the communication controller 250 of the second ECU 200. Examples of the first ECU 100 and the second ECU 200 include a drive system ECU that controls, for example, an engine, a brake device, or a steering device, a body system ECU that controls, for example, an air-conditioning device or a meter displaying various vehicle states, and an information system ECU that controls, for example, an automotive navigation system that performs a route guide from the current position to the destination. The communication controllers 150, 250 of the ECUs 100, 200 transmit and receive communication data such as various kinds of sensor data and control data through the vehicle network NW4. In the present embodiment, the vehicle network NW4 transmits and receives the communication data in accordance with a communication protocol specified in a controller area network (CAN).

The first ECU 100 and the second ECU 200 are also connected to an on-board communication device 300 through the vehicle network NW4. That is, the vehicle network NW4 mutually connects three or more on-board devices, including the first ECU 100, the second ECU 200, and the on-board communication device 300. The on-board communication device 300 includes, for example, a CPU 310, a ROM 320, a RAM 330, an I/O portion 340, a communication controller 350, and an external interface 360 that are mutually connected by a communication bus NW3. The external interface 360 performs communication with the outside of the vehicle. When the encrypted communication system performs data communication with a communication device located on an external network through the vehicle network NW4 and the external network, the secrecy of communication data is required.

In this regard, in the present embodiment, the first ECU 100 and the second ECU 200 respectively include the encrypted communication portions 160, 260, which perform encrypted communication with a center 400 located outside a vehicle using, for example, a secure socket layer (SSL). The encrypted communication portions 160, 260 respectively include encryption portions 161, 261, which encrypt data that they will transmit. When the encrypted communication portions 160, 260 transmit communication data, the encryption portions 161, 261 encrypt the communication data using encryption keys 163, 263, which are managed by the encrypted communication portions 160, 260, to convert the communication data into secrecy data.

In the present embodiment, each of the encryption keys 163, 263 is a public key of the center 400 included in an electronic certificate that is sent by the center 400 when the encrypted communication is performed with the center 400. Each of the encrypted communication portions 160, 260 verifies that the transmitter of the public key is the authentic center 400 based on the electronic certificate transmitted from the center 400. The encryption key 163 (public key) held by the first ECU 100 and the encryption key 263 held by the second ECU 200 are different pieces of key data.

When the encrypted communication portions 160, 260 perform the encrypted communication with the center 400, the encrypted communication portions 160, 260 transmit their own IDs to the center 400 in addition to the communication data, which has been encrypted by the encryption keys 163, 263. When the center 400 receives the encrypted communication data from the encrypted communication portions 160, 260, the center 400 decrypts the encrypted communication data using encryption keys (secret keys functioning as decryption keys) that it manages. More specifically, when the center 400 obtains encrypted communication data from one of the encrypted communication portions 160, 260, the center 400 retrieves the encryption key (secret key) corresponding to the ID of the one of the encrypted communication portions 160, 260, serving as the transmitter, from a database that it manages and then decrypts the encrypted communication data using the retrieved encryption key.

In the same manner, the center 400 encrypts communication data using the encryption key (public key) of the first ECU 100. The first ECU 100 includes a decryption portion 162. When the first ECU 100 obtains the encrypted communication data from the center 400, the decryption portion 162 decrypts the encrypted communication data using an encryption key (secret key functioning as decryption key) that it manages. The center 400 encrypts communication data using the decryption key (public key) of the second ECU 200. The second ECU 200 includes a decryption portion 262. When the second ECU 200 receives the encrypted communication data from the center 400, the decryption portion 262 decrypts the encrypted communication data using an encryption key (secret key functioning as decryption key) that it manages. Additionally, when the first ECU 100 and the second ECU 200 communicate with each other, communication data is encrypted in the same manner. The encrypted communication data is decrypted using the encryption key (secret key functioning as decryption key) corresponding to the ID of one of the encrypted communication portions 160, 260 serving as the transmitter.

If the first ECU 100 and the second ECU 200 individually perform encrypted communication with the center 400 via their own encrypted communication portions 160, 260, the center 400 needs to manage both the encryption key that is used in encrypted communication with the first ECU 100 and the encryption key that is used in encrypted communication with the second ECU 200. Thus, as the number of ECUs performing encrypted communication is increased, the resources of the center 400 used for the encrypted communication process would be increased.

In this regard, in the present embodiment, when the first ECU 100 and the second ECU 200 perform encrypted communication with the center 400 located outside the vehicle, the first ECU 100 and the second ECU 200 first refer to priority tables 121, 221, which serve as priority setting portions that set priority ranks of the ECUs 100, 200 for encrypted communication. Then, each of the ECUs 100, 200 performs encrypted communication with the center 400 via the encrypted communication portion of its peer ECU when the priority rank of the peer ECU is relatively high.

FIG. 2A shows one example of data contents set in the priority tables 121, 221. In the example shown in FIG. 2A, neither of the first ECU 100 and the second ECU 200 has performed encrypted communication with the center 400. Thus, the center 400 does not yet hold any one of an encryption key used in the encrypted communication performed with the first ECU 100 and an encryption key used in the encrypted communication performed with the second ECU 200. Additionally, in this example, the cipher strength of encrypted communication of the first ECU 100 using the encryption key 163 is categorized as "low," whereas the cipher strength of encrypted communication of the second ECU 200 using the encryption key 263 is categorized as "medium." Hence, the encrypted communication performed by the second ECU 200 has a higher cipher strength than the encrypted communication performed by the first ECU 100. Thus, a priority flag of encrypted communication is set on the second ECU 200 so that the second ECU 200 is given a higher priority rank than the first ECU 100. The cipher strength of encrypted communication is evaluated based on, for example, the number of bits in an encryption key or an encryption algorithm.

FIG. 2B shows one example of data contents set in the priority tables 121, 221 when a third ECU is newly connected to the vehicle network NW4 after the priority flag of encrypted communication is set on the second ECU 200 as shown in FIG. 2A. In the example shown in FIG. 2B, the cipher strength of encrypted communication performed by the added third ECU is categorized as "high." Thus, the encrypted communication performed by the third ECU has a higher cipher strength than the encrypted communications performed by the first ECU 100 and the second ECU 200. Accordingly, the subject on which the priority flag of encrypted communication is set is switched from the second ECU 200 to the third ECU so that the third ECU is set to a higher priority rank than the first ECU 100 and the second ECU 200.

FIG. 3A shows another example of data contents set in the priority tables 121, 221. In the example shown in FIG. 3A, while the first ECU 100 has not performed encrypted communication with the center 400, the second ECU 200 has performed encrypted communication with the center 400. Thus, the center 400 holds the encryption key used in the encrypted communication performed with the second ECU 200. Therefore, the priority flag of encrypted communication is set on the second ECU 200 so that the second ECU 200 is given a higher priority rank than the first ECU 100.

FIG. 3B shows one example of data contents set in the priority tables 121, 221 when a third ECU is newly connected to the vehicle network NW4 after the priority flag of encrypted communication is set on the second ECU 200 as shown in FIG. 3A. In the example shown in FIG. 3B, the cipher strength of encrypted communication performed by the added third ECU is categorized as "high." Thus, the encrypted communication performed by the third ECU has a higher cipher strength than the encrypted communications performed by the first ECU 100 and the second ECU 200. However, as described above, the second ECU 200 has performed encrypted communication with the center 400, and the center 400 already holds the encryption key used in the encrypted communication with the second ECU 200. Thus, the subject of the priority flag of encrypted communication is not switched to the third ECU, and the second ECU 200 keeps the priority flag. Therefore, the second ECU 200 is set to a higher priority rank than the first ECU 100 and the third ECU. The third ECU, which is newly connected to the vehicle network NW4, also has a priority table in which data contents are set as shown in FIG. 3B.

As shown in FIG. 1, a dedicated communication line NW5, which is a communication path differing from the vehicle network NW4 described above, is provided between the I/O portion 140 of the first ECU 100 and the I/O portion 240 of the second ECU 200 to connect the ECUs 100, 200 to each other separately from other devices, that is, independently from other devices. In the same manner, a dedicated communication line NW6, which is a communication path differing from the vehicle network NW4 described above, is provided between the I/O portion 240 of the second ECU 200 and the I/O portion 340 of the on-board communication device 300 to connect the second ECU 200 and the on-board communication device 300 to each other separately from other devices, that is, independently from other devices. For example, a USB communication cable, a PCI-E bus, or a serial connection line may be used as the communication lines NW5, NW6. The communication speed of the dedicated communication lines NW5, NW6, which connect the ECUs 100, 200 to each other or the second ECU 200 and the on-board communication device 300 separately from other devices, that is, independently from other devices, tends to be higher than the communication speed of the vehicle network NW4, which mutually connects the ECUs 100, 200 and the on-board communication device 300. Additionally, the secrecy of information against an external unauthorized access is easily ensured by the dedicated communication lines NW5, NW6 as compared to the vehicle network NW4.

In the present embodiment, when each of the first ECU 100 and the second ECU 200 performs encrypted communication with the center 400, the first ECU 100 and the second ECU 200 refer to the priority tables 121, 221 and, if another ECU has a higher priority rank, transmits unencrypted communication data to the ECU having the higher priority rank through the communication line NW5. When the ECU having the higher priority rank receives unencrypted communication data from the ECU having a lower priority rank, the ECU having the higher priority rank encrypts the received communication data using an encryption key that it manages and then transmits the encrypted communication data to the on-board communication device 300 through the communication lines NW5, NW6. The on-board communication device 300 transmits the communication data, which is received from the ECU, to the center 400 located outside the vehicle via the external interface 360.

The operation of the encrypted communication system of the present embodiment will now be described particularly focusing on the operation when the first ECU 100 and the second ECU 200 perform encrypted communication with the center 400.

Figure 4:
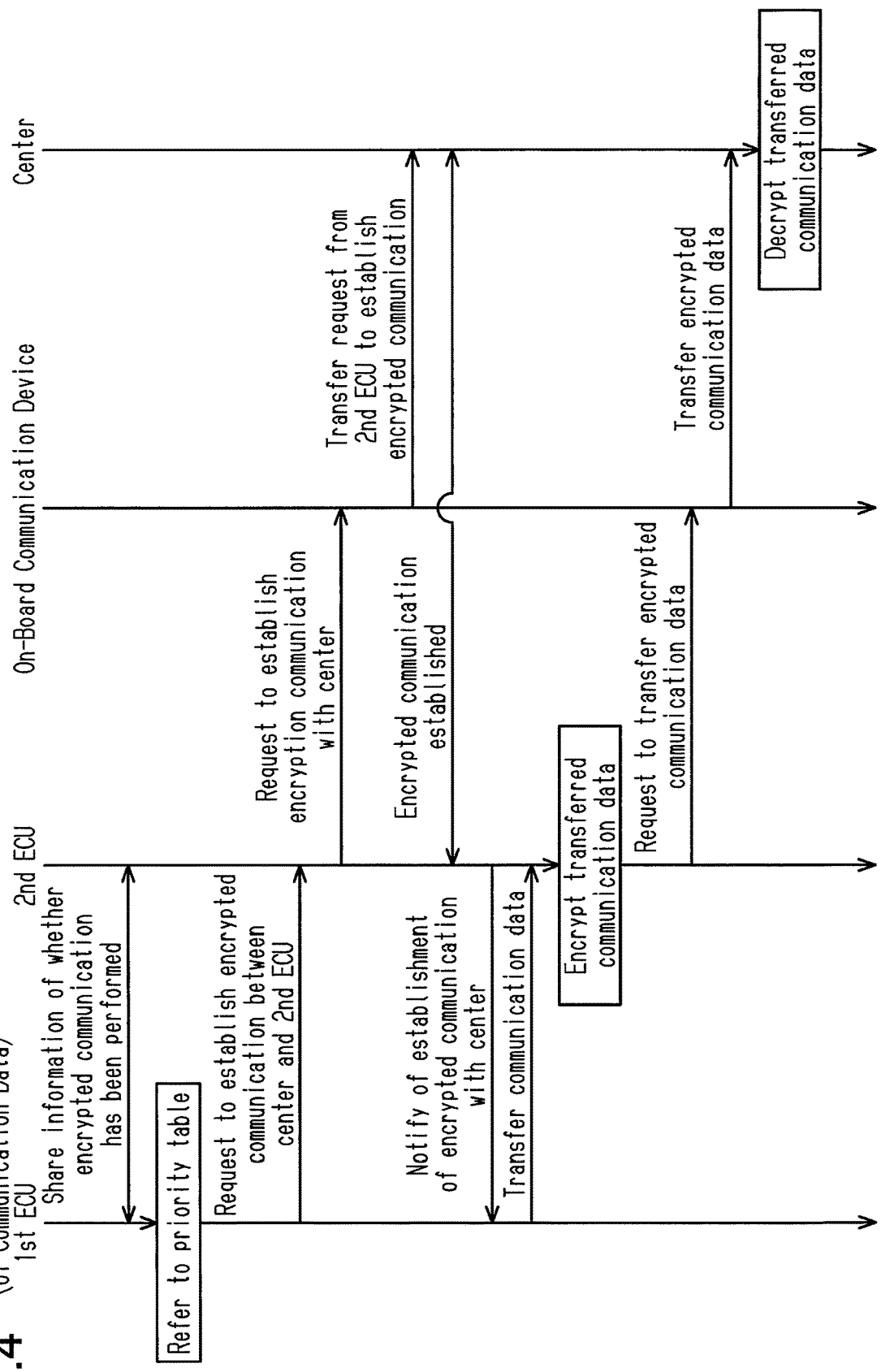
FIG. 4 is a sequence chart showing a flow of information when the encrypted communication system of FIG. 1 performs encrypted communication with a center.

As shown in FIG. 4, when the communication subject of communication data is the first ECU 100, the first ECU 100 shares, with the second ECU 200, information of whether or not encrypted communication has been performed with the center 400.

The first ECU 100 refers to the priority table 121, in which the priority ranks are set based on whether or not the first and second ECUs 100, 200 have performed encrypted communication, to determine the communication subject of encrypted communication. In the present embodiment, as shown in FIGS. 2A and 3A, the second ECU 200 is set to a higher priority rank than the first ECU 100. Thus, the second ECU 200 is determined as the communication subject of encrypted communication. The first ECU 100 requests the second ECU 200 to establish encrypted communication between the center 400 and the second ECU 200.

The second ECU 200 then requests the on-board communication device 300 to establish encrypted communication with the center 400 based on the request from the first ECU 100. The on-board communication device 300 transfers the request from the second ECU 200 to the center 400 to establish encrypted communication. Consequently, the encrypted communication is established between the second ECU 200 and the center 400.

When the encrypted communication with the center 400 is established, the second ECU 200 notifies the first ECU 100 of the establishment. The first ECU 100 transfers unencrypted communication data that it manages to the second ECU 200 through the communication line NW5.

The second ECU 200 encrypts the communication data, which is transferred from the first ECU 100, using the encryption key 263, which it manages, and requests the on-board communication device 300 to transfer the encrypted communication data. The on-board communication device 300 transfers the encrypted communication data to the center 400 based on the request from the second ECU 200.

The center 400 retrieves the encryption key corresponding to the ID of the second ECU 200 from its own database and decrypts the communication data, which is transferred from the on-board communication device 300, using the retrieved encryption key to obtain the unencrypted communication data.

Figure 5:
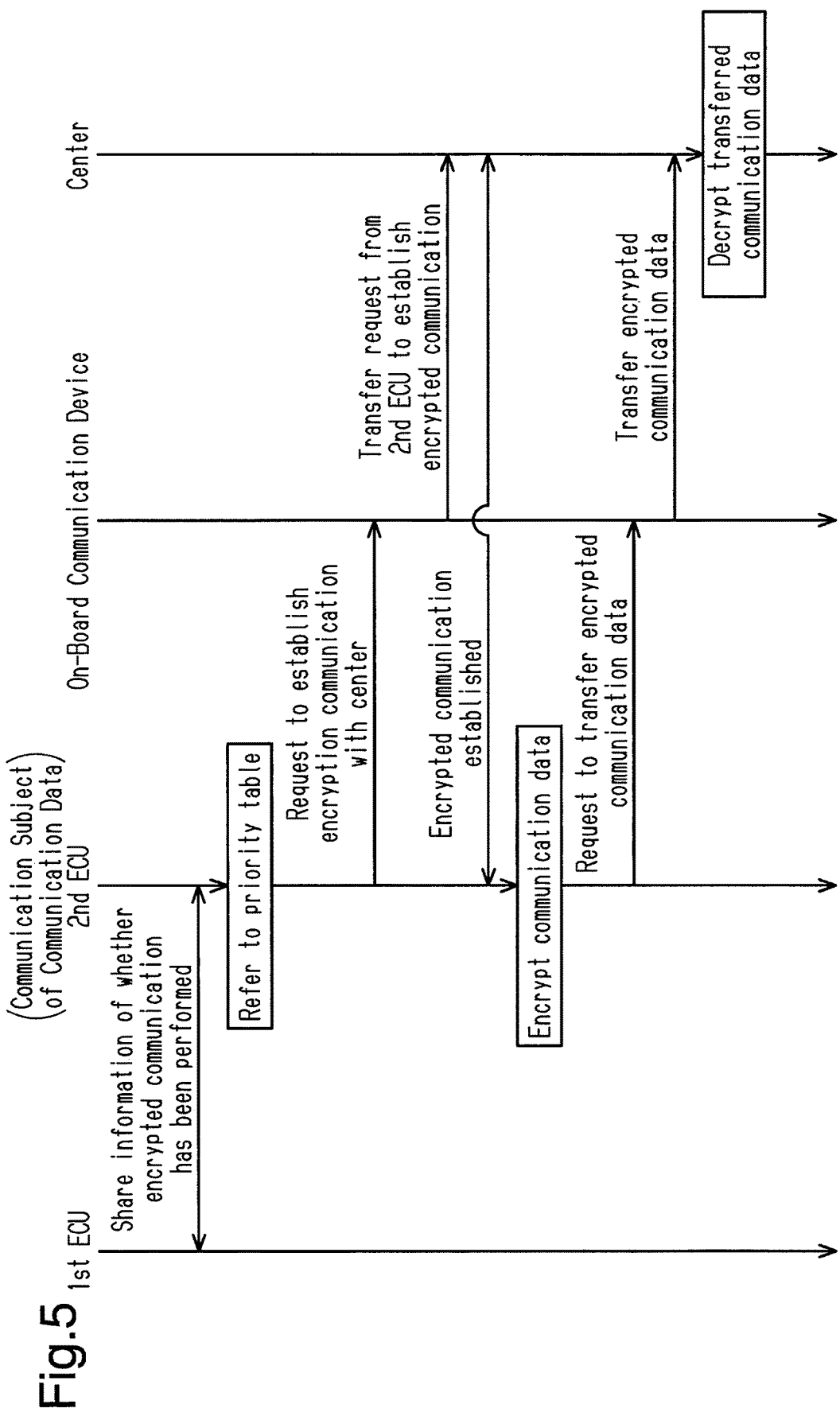
FIG. 5 is a sequence chart showing a flow of information when the encrypted communication system of FIG. 1 performs encrypted communication with the center.

As shown in FIG. 5, when the communication subject of communication data is the second ECU 200, the second ECU 200 first shares, with the first ECU 100, information of whether or not encrypted communication has been performed with the center 400.

Then, the second ECU 200 refers to the priority table 221, in which the priority ranks are set based on whether or not the first and second ECUs 100, 200 have performed encrypted communication, to determine the communication subject of encrypted communication. As described above, in the present embodiment, the second ECU 200 is set to a higher priority rank than the first ECU 100. Thus, the second ECU 200 is determined as the communication subject of encrypted communication.

Then, the second ECU 200 requests the on-board communication device 300 to establish encrypted communication with the center 400. The on-board communication device 300 transfers the request from the second ECU 200 to the center 400 to establish encrypted communication. Consequently, the encrypted communication is established between the second ECU 200 and the center 400.

When the encrypted communication with the center 400 is established, the second ECU 200 encrypts communication data that it manages using the encryption key 263, which it manages, and requests the on-board communication device 300 to transfer the encrypted communication data. The on-board communication device 300 transfers the encrypted communication data to the center 400 based on the request from the second ECU 200.

The center 400 retrieves the encryption key corresponding to the ID of the second ECU 200 from its own database and decrypts the communication data, which is transferred from the on-board communication device 300, using the retrieved encryption key to obtain the unencrypted communication data.

The effects of the encrypted communication system of the present embodiment will now be described.

In general, when a plurality of ECUs installed in a vehicle separately performs encrypted communication with the center 400 located outside the vehicle, the center 400 normally needs to manage encryption keys (secret keys) separately set for each ECU. With this configuration, as the number of ECUs performing encrypted communication is increased, the resources of the center 400 used for the encrypted communication process would be increased.

In this regard, in the present embodiment, when a predetermined one of the first ECU 100 and the second ECU 200 performs encrypted communication with the center 400, the predetermined ECU refers to the priority tables 121, 221 to check the priority ranks of the ECUs 100, 200 for encrypted communication. When the predetermined ECU performs encrypted communication with the center 400, if another ECU has a higher priority rank than the predetermined ECU, the predetermined ECU uses the encryption key managed by the ECU having the higher priority rank. This limits increases in the resources of the center 400 used for the encrypted communication process, which would result when the number of ECUs performing encrypted communication is increased.

Particularly, in the present embodiment, when any one of the first ECU 100 and the second ECU 200 has performed encrypted communication with the center 400, the ECU having performed encrypted communication is set to a higher priority rank than the other ECU. More specifically, when one of the first ECU 100 and the second ECU 200 has performed encrypted communication with the center 400, the encryption key managed by the ECU having performed encrypted communication is also used to transmit communication data of the other ECU through encrypted communication performed with the center 400. Thus, even when the number of ECUs performing encrypted communication is increased, the center 400 needs to manage only the encryption key used in encrypted communication performed with the ECU that has first established encrypted communication. This reduces the resources of the center 400 used for the encrypted communication process.

Further, in the present embodiment, when a third ECU is newly connected to the vehicle network NW4, if any one of the first ECU 100 and the second ECU 200, which have been connected to the vehicle network NW4, has performed encrypted communication with the center 400, the ECU having performed encrypted communication is set to a higher priority rank than the third ECU, which is added as described above. Thus, when the newly added third ECU performs encrypted communication with the center 400, only the encryption key that is already held by the center 400 needs to be used to encrypt and decrypt communication data. That is, even when the third ECU is newly connected to the vehicle network NW4, the addition of the third ECU will not increase the resources of the center 400 used for the encrypted communication process.

Additionally, in the present embodiment, when a predetermined ECU performs encrypted communication with the center 400, if neither of the first ECU 100 and the second ECU 200, which are installed in the vehicle, has performed encrypted communication with the center 400, the cipher strengths of encrypted communications performed by the encrypted communication portions 160, 260 of the first and second ECUs 100, 200 are compared to each other. One of the ECUs having a relatively high cipher strength is set to a higher priority than the other ECU. More specifically, when neither of the first ECU 100 and the second ECU 200 has performed encrypted communication with the center 400, the encryption key managed by the ECU having the relatively high cipher strength is also used to transmit communication data of the other ECU through encrypted communication performed with the center 400. Consequently, while the resources of the center 400 used for the encrypted communication process are reduced, the security level of encrypted communication of the first and second ECUs 100, 200 performed with the center 400 is increased.

Additionally, in the present embodiment, even when the third ECU is newly connected to the vehicle network NW4, if neither of the first ECU 100 and the second ECU 200 has performed encrypted communication with the center 400, the cipher strengths of encrypted communications performed by the ECUs connected to the vehicle network NW4, including the newly added third ECU, are compared to each other. Then, one of the ECUs having a relatively high cipher strength is set to a higher priority rank than the rest of the ECUs. More specifically, when the encrypted communication performed by the newly added third ECU has a higher cipher strength than the encrypted communication performed by the other ECUs, the encryption key managed by the third ECU is also used to transmit communication data of the other ECUs through encrypted communication performed with the center 400. This reduces the resources of the center 400 used for the encrypted communication process. Additionally, the ECU having the higher cipher strength is newly connected to the vehicle network NW4. This increases the security level of encrypted communication of all of the ECUs connected to the vehicle network NW4 performed with the center 400.

Accordingly, the above embodiment has the advantages described below.

(1) Even when the plurality of the ECUs 100, 200 having the encrypted communication portions 160, 260 is installed in a single vehicle, the ECUs 100, 200 perform encrypted communication with the center 400 using the encryption key managed by one of the ECUs having a higher priority rank. Thus, as compared to when the ECUs 100, 200 perform encrypted communication with the center 400 located outside the vehicle using encryption keys unique to each of the ECUs 100, 200, the resources of the center 400 used for the encrypted communication process are reduced. Additionally, each of the ECUs 100, 200 is capable of independently performing encrypted communication with the center 400.

(2) When any one of the ECUs 100, 200 has performed encrypted communication with the center 400, the center 400 already holds the encryption key used in encrypted communication performed between the center 400 and the ECU having performed encrypted communication. When one of the ECUs 100, 200 that has not performed encrypted communication transmits communication data to the center 400, the communication data is encrypted using the encryption key managed by the ECU having performed encrypted communication. This allows the center 400 to perform encrypted communication with the ECU without obtaining a new encryption key. Consequently, while the resources of the center 400 used for the encrypted communication process are reduced, each of the ECUs 100, 200 is capable of independently performing encrypted communication with the center 400.

(3) Another ECU may be newly added to perform encrypted communication with the center 400. Even in this case, when the newly added ECU transmits communication data to the center 400, the communication data is encrypted using the encryption key managed by an ECU having performed encrypted communication. This limits increases in the resources of the center 400 used for the encrypted communication process, which would result when an ECU is added to perform encrypted communication with the center 400.

(4) When none of the plurality of ECUs 100, 200 has performed encrypted communication with the center 400, encrypted communication is established between the center 400 and one of the ECUs having a relatively high cipher strength. Then, communication data of the other ECU is encrypted using the encryption key of the ECU that established encrypted communication with the center 400. Consequently, while the resources of the center 400 used for the encrypted communication process are reduced, the security level of encrypted communication of the ECUs 100, 200 performed with the center 400 is increased.

(5) When an ECU is newly added to perform encrypted communication with the center 400, none of the existing ECUs 100, 200 may have performed encrypted communication with the center 400. In this case, under a condition in which the encrypted communication of the newly added ECU has a higher cipher strength than the encrypted communication of the existing ECUs 100, 200, encrypted communication is established between the newly added ECU and the center 400. Then, the encryption key of the newly added ECU is used to encrypt communication data of the other ECUs. This reduces the resources of the center 400 used for the encrypted communication process. Additionally, the addition of the ECU having the higher cipher strength increases the security level of encrypted communication of all of the ECUs installed in the vehicle performed with the center 400.

(6) The dedicated communication lines NW5, NW6, which easily ensure the information security as compared to the vehicle network NW4, are used as the communication paths used when an ECU transmits unencrypted communication data to another ECU. Thus, as compared to a configuration in which the plurality of ECUs 100, 200 transmits unencrypted communication data through the mutually connected vehicle network NW4, the risk of unencrypted communication data being eavesdropped by a third party is limited. This further increases the security level of encrypted communication performed between the center 400 and the plurality of ECUs 100, 200.

The above embodiment may be modified as follows.

In the above embodiment, when an ECU is newly added to perform encrypted communication with the center 400, if any one of the existing ECUs 100, 200 has performed encrypted communication with the center 400, communication data is encrypted using the encryption key that is managed by the ECU having performed encrypted communication without considering the cipher strength of encrypted communication of the newly added ECU. Instead, even when any one of the existing ECUs 100, 200 has performed encrypted communication with the center 400, the encryption key that is managed by the newly added ECU may be used to encrypt communication data of each of the newly added ECU and the existing ECUs 100, 200, if necessary, by resetting the data related to whether or not encrypted communication has been performed.

In the above embodiment, the dedicated communication lines NW5, NW6, which easily ensure the information security as compared to the vehicle network NW4, are used as the communication paths used to transmit unencrypted communication data from one ECU to another ECU. However, if the information security can be ensured in communication performed through the vehicle network NW4, unencrypted communication data may be transmitted between the ECUs through the vehicle network NW4. In this case, the dedicated communication lines NW5, NW6, which connect the ECUs 100, 200 to each other or the second ECU 200 and the on-board communication device 300, may be omitted from the configuration.

In the above embodiment, when none of the ECUs connected to the vehicle network NW4 has performed encrypted communication with the center 400, the priority ranks for encrypted communication are set in advance based on the cipher strengths of encrypted communications performed by the ECUs. Instead, when none of the ECUs connected to the vehicle network NW4 has performed encrypted communication with the center 400, after all of the ECUs are connected to the vehicle network NW4, one of the ECUs that first performs encrypted communication with the center 400 may be set to a higher priority rank than the rest of the ECUs without taking into any consideration the cipher strengths of encrypted communications performed by the ECUs.

The above embodiment is described as an example in which the ECUs 100, 200 connected to the vehicle network NW4 differ from each other in the cipher strength of encrypted communication. However, the ECUs 100, 200 connected to the vehicle network NW4 do not necessarily have to differ from each other in the cipher strength of encrypted communication. In this case, for example, the priority ranks of the ECUs for encrypted communication are not set in advance. After the ECUs 100, 200 are connected to the vehicle network NW4, one of the ECUs that first performs encrypted communication with the center 400 may be set to a higher priority than the other ECU.

In the above embodiment, when none of the ECUs connected to the vehicle network NW4 has performed encrypted communication with the center 400, the priority ranks for encrypted communication are set in advance based on the cipher strengths of encrypted communications performed by the ECUs. However, the priority ranks for encrypted communication may be set in advance based on elements other than the cipher strengths of encrypted communications, for example, the processability of the CPUs mounted on the ECUs, the distances to the on-board communication device 300 through the communication lines NW5, NW6 on the network, or the like. More specifically, among a plurality of ECUs, one of the ECUs having more advantageous conditions for performing encrypted communication only needs to be set to a higher priority rank.

The setting the priority ranks of the plurality of ECUs 100, 200 for encrypted communication in the priority tables 121, 221 may mean that the priority tables 121, 221, in advance, store priority ranks that are automatically or manually set before or when the vehicle is shipped, that the priority tables 121, 221 automatically set priority ranks after the shipment of the vehicle, or that the priority tables 121, 221 store priority ranks that are manually set after the shipment of the vehicle.

The above embodiment is described as an example in which the ECUs 100, 200 and the center 400 perform encrypted communication in accordance with public key cryptography. However, the encrypted communication method of the ECUs 100, 200 and the center 400 does not necessarily have to be limited to the public key cryptography and may be a different encrypted communication method such as symmetric key cryptography.

Therefore, the present examples and embodiments are to be considered as illustrative and not restrictive and the invention is not to be limited to the details given herein, but may be modified within the scope and equivalence of the appended claims.

The invention claimed is:

1. A communication system comprising a plurality of processors coupled with a network, each of the processors having a predefined encryption method for a communication with a server, each of the processors configured to:
   determine a primary processor of the processors based on at least one of a processability of the processor, network distance to the processor, or cipher strengths;
   when the processor is not determined as the primary processor, transfer unencrypted communication data through the network to the primary processor; and
   when the processor is determined as the primary processor, perform an encryption of unencrypted communication data received, and an encrypted communication with the server by the encryption method of the primary processor.

2. The communication system according to claim 1, wherein if any one of the plurality of processors has performed encrypted communication with the server, each of the plurality of processors is configured to determine the processor having performed encrypted communication as the primary processor.

3. The communication system according to claim 2, wherein if none of the plurality of processors has performed encrypted communication with the server, each of the plurality of processors is configured to determine one of the plurality of processors having a relatively high cipher strength as the primary processor.

4. The communication system according to claim 2, wherein when an processor is newly added to perform encrypted communication with the server and if none of the plurality of processors has performed encrypted communication with the server and the added processor has a higher cipher strength than the plurality of processors, each of the plurality of processors is configured to determine the added processor as the primary processor.

5. The communication system according to claim 1, further comprising a communication line connecting each of the plurality of processors and another one of the plurality of processors separately from the rest of the plurality of processors,
   wherein each of the processors is configured to
   when the processor performs encrypted communication with the server and if the processor is not determined as the primary processor, transmit unencrypted communication data to the primary processor through the communication line.

6. A controlling method for controlling a communication system including a plurality of processors coupled with a network, each of the processors having a predefined encryption method for a communication with a server, the controlling method comprising:
   causing each of the processors to determine a primary processor of the processors based on at least one of a processability of the processor, network distance to the processor, or cipher strengths;
   causing one of the processors which is not determined as the primary processor to transfer unencrypted communication data through the network to the primary processor; and
   causing the primary processor to perform, by the encryption method of the primary processor, an encryption of the unencrypted communication data transferred through the network, and an encrypted communication with the server.

* * * * *